(12) United States Patent
Fitz et al.

(10) Patent No.: US 8,750,444 B2
(45) Date of Patent: Jun. 10, 2014

(54) SNAPSHOT PROCESSING OF TIMING DATA

(75) Inventors: Michael Paul Fitz, Los Angeles, CA (US); Scott Warren Enserink, Long Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 114 days.

(21) Appl. No.: 13/102,557

(22) Filed: May 6, 2011

(65) Prior Publication Data

US 2012/0281796 A1 Nov. 8, 2012

(51) Int. Cl.
*H04L 7/02* (2006.01)
(52) U.S. Cl.
USPC .......................................... 375/359; 375/316
(58) Field of Classification Search
USPC ................... 375/359, 142; 370/337; 455/522; 398/52
See application file for complete search history.

(56) References Cited

U.S. PATENT DOCUMENTS

| | | | |
|---|---|---|---|
| 5,255,290 A | 10/1993 | Anvari | |
| 5,353,312 A | 10/1994 | Cupo et al. | |
| 5,485,489 A | 1/1996 | Chiba | |
| 5,625,652 A | 4/1997 | Petranovich | |
| 5,692,014 A | 11/1997 | Basham et al. | |
| 5,742,415 A * | 4/1998 | Manning et al. | 398/52 |
| 5,838,254 A | 11/1998 | Kokubu et al. | |
| 5,963,603 A | 10/1999 | Li et al. | |
| 5,999,561 A * | 12/1999 | Naden et al. | 375/142 |
| 6,363,131 B1 | 3/2002 | Beidas et al. | |
| 6,628,738 B1 | 9/2003 | Peeters et al. | |
| 6,873,666 B2 | 3/2005 | Chen | |
| 7,277,504 B2 | 10/2007 | Smit | |
| 8,135,427 B2 * | 3/2012 | Muqattash et al. | 455/522 |
| 2005/0195772 A1* | 9/2005 | Nishikawa et al. | 370/337 |
| 2006/0133525 A1 | 6/2006 | Awad | |
| 2006/0245522 A1 | 11/2006 | Astrachan | |
| 2006/0285616 A1 | 12/2006 | Yen et al. | |
| 2007/0217525 A1 | 9/2007 | Vrcelj et al. | |

* cited by examiner

*Primary Examiner* — Daniel Washburn
*Assistant Examiner* — Fitwi Hailegiorgis
(74) *Attorney, Agent, or Firm* — John A. Miller; Miller IP Group, PLC

(57) ABSTRACT

A method for providing timing recovery from a received digital data stream where the digital data stream is a series of consecutive data samples. The method separates the data stream into a series of consecutive observation periods where each observation period includes the same number of consecutive data samples. The method also includes identifying a series of consecutive timing recovery data samples in each observation period where the timing recovery data samples are used for timing recovery and other data samples in the observation period are not used for timing recovery, and where the number of data samples used for timing recovery in each observation period is less than the number of data samples that are not used for timing recovery in the observation period. The method then uses the timing recovery data samples for timing recovery in each observation period.

20 Claims, 2 Drawing Sheets

US 8,750,444 B2

SNAPSHOT PROCESSING OF TIMING DATA

BACKGROUND

1. Field of the Disclosure

This disclosure relates generally to a method for providing timing recovery from a digital data stream and, more particularly, to a method for providing timing recovery from a digital data stream that includes only using a portion or sub-set of consecutive data samples in each of consecutive observation periods so that the timing recovery circuit can operate at a slower clock rate than the data clock.

2. Discussion of the Related Art

Digital signals can be wirelessly transmitted from a transmitter to a receiver where data and other information can be recovered. However, there is typically a discrepancy between the sample clock in the transmitter that transmitted the signal and the sample clock in the receiver that receives the signal that causes inter-symbol interference (ISI), and possible loss of data. Therefore, symbol timing recovery must be performed in front-end circuitry of the receiver to sufficiently recover the data in the received signal. For non-data-aided timing recovery, the timing information is encoded on a carrier frequency using symbols that are defined by changes in amplitude and phase of the transmitted signal. Timing recovery requires that the circuit identify when those changes in phases and amplitude occur in the signal.

The digital data is encoded on the carrier wave by different modulation schemes, including continuous phase modulation and linear stream modulation, well known to those skilled in the art. Traditional communications system use different timing recovery synchronization architectures for continuous phase modulation and linear stream modulation transmission protocols. The traditional timing recovery architecture that provided linear stream modulation typically included passing the received signal through a non-linearity circuit to generate a signal oscillating at the clock frequency. This signal is filtered and in-phase and quadrature phase (I/Q) down-converted to produce a time estimate.

One known down-converting methodology is referred to in the art as Fs/4 down-conversion that down-converts a received signal to an intermediate frequency (IF) to produce both the in-phase and quadrature phase components of the signal. However, known timing recovery circuits in receiver front-ends are typically unable to provide Fs/4 down-conversion for both continuous phase modulation and linear stream modulation.

DETAILED DESCRIPTION OF THE EMBODIMENTS

The following discussion of the embodiments of the disclosure directed to a method for providing timing recovery from a digital data stream is merely exemplary in nature, and is in no way intended to limit the invention or its applications or uses.

Figure 1:
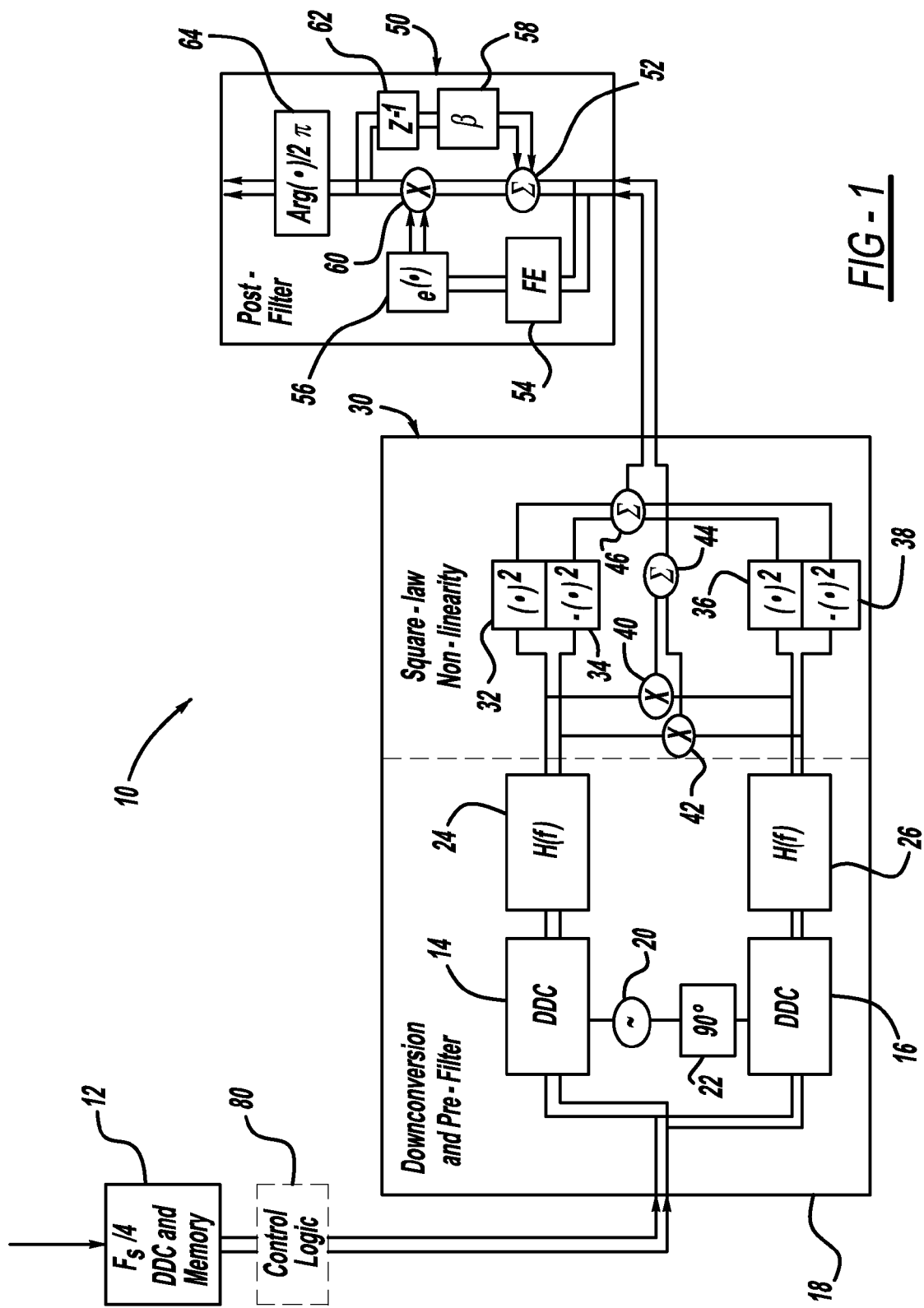
FIG. 1 is a schematic block diagram of a timing recovery circuit.

FIG. 1 is a schematic block diagram of a timing recovery circuit 10 that is able to provide non-data-aided digital timing recovery of Fs/4 down-converted signals for both continuous phase modulated and linear stream modulated signals. The timing recovery circuit 10 would be part of a receiver front-end that receives the signals transmitted from a suitable transmitter (not shown). The signal is received by a suitable antenna (not shown) and pre-processing of the signals is performed, including analog-to-digital conversion, as would be well understood to those skilled in the art. The digital pre-processed signals are then sent to a digital down-converter 12 that provides Fs/4 digital down-conversion to produce both in-phase and quadrature phase components of the received signal that are 90° apart in phase at an intermediate frequency (IF) in a manner that is well understood to those skilled in the art. Although the circuit 10 provides timing recovery for Fs/4 down-converted signals in this embodiment, this is merely illustrative in that other types of digitally down-converted signals will be applicable for timing recovery in the circuit 10.

The output of the digital down-converter 12 includes in-phase and quadrature phase Fs/4 IF signals that are offset in time by one quarter of a sampling period. Both the in-phase signals and the quadrature phase signals are sent to an in-phase direct down-converter (DDC) 14 and a quadrature phase DDC 16 in a down-conversion and pre-filtering sub-circuit 18 of the circuit 10 that down-convert the in-phase and quadrature phase signals from the intermediate frequency to a baseband frequency. The IF down-conversion performed by the down-converter 12 provides a signal having a certain bandwidth, where the timing information is provided at the edge of the signal's bandwidth. By further down-converting the signal to the baseband frequency, the middle portion between the edges of the signal's bandwidth can be eliminated so that basically only the edge portions of the signal remains.

The DDCs 14 and 16 multiply the in-phase and quadrature phase signals by a sinusoidal signal from an oscillator 20, where the sinusoidal signal is offset by 90° using a delay 22 for the quadrature phase DDC 16. In this embodiment, the oscillator 20 has a frequency of $f_c = \frac{1}{2}T_{sym}$, where $T_{sym}$ is the symbol time. The DDC 14 multiplies the in-phase signal and the quadrature phase signal by a cosine part of the sinusoidal signal from the oscillator 20 and the DDC 16 multiplies the in-phase signal and the quadrature phase signal by a sine part of the sinusoidal signal from the oscillator 20 by shifting it 90° via the delay 22.

The cosine in-phase and quadrature phase down-converted signals from the DDC 14 are sent to an accumulator filter 24 and the sine in-phase and quadrature phase down-converted signals from the DDC 16 are sent to an accumulation filter 26 that remove interstitial zero terms from the Fs/4 down-conversion so that extra zeros in the signal can be removed. Because the signals are down-converted prior to filtering, simple low-pass filtering is performed on the baseband signals to provide signal smoothing and reduce noise. This filtering does not need to consider that the signals are Fs/4 quadrature phase signals.

The filtered cosine in-phase and quadrature phase signals and the filtered sine in-phase and quadrature phase signals are then sent to a square-law non-linearity processor 30 that performs squaring non-linearity that accentuates the timing information contained in the signals. The filtered cosine in-phase signal is squared at box 32, the filtered cosine quadrature phase signal is squared at box 34, the filtered sine in-phase signal is squared at box 36 and the filtered sine quadrature phase signal is squared at box 38. Additionally, the cosine and sine in-phase signals are multiplied by a multiplier 40 and the cosine and sine quadrature phase signals are multiplied by a multiplier 42, and the two multiplied signals are added by a summer 44. Also, all of the squared signals from the boxes 32, 34, 36 and 38 are added by a summer 46 to complete the square-law non-linearity process and provide non-linear in-phase and quadrature phase signals.

Because the down-conversion to baseband is performed prior to the square-law non-linearity process, the frequency of the down-conversion can be reduced by half. Further, because the down-conversion to baseband and the filtering is performed in the sub-circuit 18 prior to the square-law non-linearity process in the processor 30, the circuit 10 can provide timing recovery for Fs/4 down-converted signals for both continuous phase modulation and linear stream modulation.

The non-linear in-phase signal and the quadrature phase signal from the square-law non-linearity processor 30 are then sent to a single-pole, low-pass post-filter 50 that uses a frequency de-rotation filter that provides low complexity, feed-forward recovery of the timing estimates.

The symbol timing information contained in the phase relationship between the non-linear in-phase and quadrature phase signals is obscured by noise that makes the exact position of the symbol unknown. To correct for this noise and provide signal smoothing, the current in-phase and quadrature phase signals are added to a weighted sum of previous values by a summer 52. The previous sum of the in-phase and quadrature phase signals is provided by a delay box 62. The value β at box 58 provides a weighting factor between the new value and the previous values. The value β is selected to determine how much the previous summation, and its associated symbol position information, will be weighted to determine a new summation, and thus a new symbol position, where the higher the value, the more weight is given to the previous position. Thus, the value β provides the amount of filtering performed by the low-pass filter. The summation at the summer 52 provides a one-pole, low-pass filter that provides signal smoothing for the new in-phase and quadrature values being received to remove noise and identify the proper location of the symbol.

The symbols may also be rotating from one time period to the next time period, due to a frequency offset. To correct this offset, a frequency estimation (FE) of the new symbols is provided at box 54 to determine how much rotation has occurred from one sample point to the next sample point. The frequency offset is identified at box 56, and is used by a complex-exponential multiplier 60 to compensate for the frequency offset.

An arctangent of the in-phase and quadrature phase signals is taken at box 64 and divided by 2π to give the actual output time estimation from the circuit 10. The angle between the in-phase value and the quadrature phase value provides the timing estimate, which is given by the arctangent of the angle. The division by 2π causes the timing estimate to be in fractions of a symbol period as opposed to radians.

As discussed above, timing recovery in digital receivers allows the receiver clock to know when to look at each symbol in the received signal to look for changes in the signal. Timing recovery synchronizes the receiver clock to those changes as generated in the transmitter. The timing information that is used to provide timing recovery, such as by the circuit 10, is contained in continuous samples or data points of the received signal. Therefore, known timing recovery circuits typically looked at every sample within an observation period to provide the timing estimate. As the sample clock speed increases for high data rate systems, the timing recovery circuit must operate at a very high processing rate to look at every sample. Thus, timing recovery systems become very complex as the data rate of the system increases.

It has been observed that although the symbol frequency of the system may increase for high data rate systems, the actual timing information in those high frequency signals changes relatively slowly. Thus, high data rate signal processing is typically not needed to provide accurate timing estimates in high data rate modem systems. In other words, the phase offset between the transmitter clock and the receiver clock that defines the mismatch in the timing changes relatively slowly as compared to the frequency of how often data is received by the receiver. Timing estimation techniques that require less over-sampling have been proposed, but do not reduce the frequency of the timing estimation circuit below the RF sampling rate.

The present disclosure also proposes a method for generating timing estimates over an observation period that uses a continuous sub-set or a snapshot of the full set of samples in the observation period. The timing estimation algorithm processes the snapshot over the full time of the observation period, thus allowing the timing recovery circuit to operate at a fraction of the operating frequency of the receiver while still retaining the continuous samples that contain the timing information.

As discussed above, processing timing estimates with minimal delay at the sample rate is costly and complex at high sample rates. Using a continuous sub-set of these samples allows the timing estimation circuit to operate at a lower frequency, and thus reduces the cost and complexity of the design. Advantages of this proposed approach include obtaining a continuous snapshot that generates a waveform with the desired timing information and making this snapshot have a small duty cycle that reduces the processing complexity needed to produce the timing estimates and matches the process complexity more closely to the tracking bandwidth needed for timing recovery. The timing estimation can still be performed at a full data rate.

Figure 2:
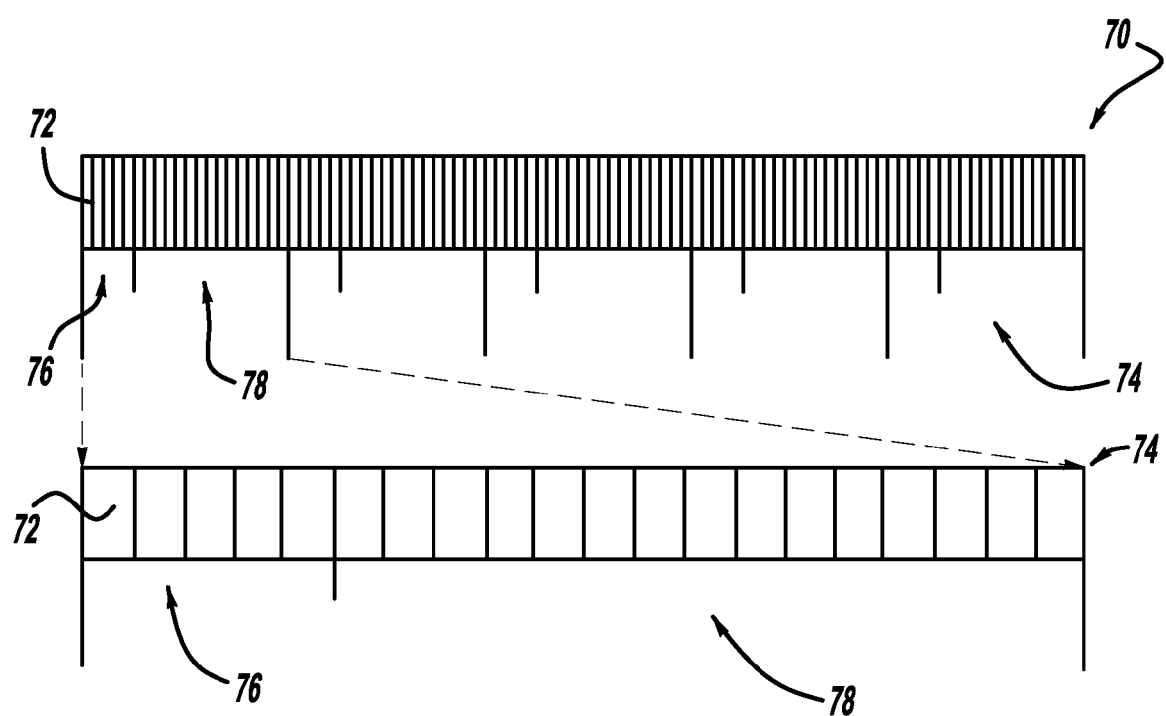
FIG. 2 is an illustration of digital data samples received by the circuit shown in FIG. 1 where a portion of the data samples is used for timing recovery.

FIG. 2 is a representation of a data stream 70 that illustrates the timing recovery process described above. The data stream 70 includes a series of consecutive data points or samples 72. A certain number of the consecutive samples 72 are defined as an observation period 74 over which timing estimations between the transmitter and the receiver are determined, where the observation periods 74 are also continuous. Each observation period 74 is separated into a first portion 76 including a plurality of consecutive samples 72 that defines the snapshot of samples used for timing recovery and a second portion 78 including a plurality of consecutive samples 72 that are not used for timing recovery. As is apparent, the non-timing recovery portion 78 includes many more of the samples 72 than the timing recovery portion 76 in the observation period 74, thus allowing the timing recovery circuit to operate much slower than the actual data rate.

The specific number of the samples 72 necessary for timing recovery would be application specific, where more of the samples 72 would be required as noise in the system increased. Although the first portion 76 that includes the samples 72 that are used for timing recovery are shown to come from a beginning of the observation period 74, this is by way of a non-limiting example in that the sub-set of the consecutive samples 72 that are used for timing recovery in the observation period 74 can come from any location in the observation period 74 as long as the samples are continuous. Further, the timing recovery circuit that looks at the first portion 76 of the samples 72 used for timing recovery would reduce the sampling clock rate necessary to process the number of samples 72 over the time provided by the observation period 74. In other words, the amount of time needed for all of the samples 72 in the observation period 74 at the higher data rate is the amount of time used to process the samples 72 in the first portion 76, so that the time provided by the observation period 74 and the number of samples in the first portion 76 determines the clock rate for timing recovery.

The process for providing signal timing recovery using a continuous sub-set of samples as discussed above with reference to FIG. 2 can be used in the circuit 10, although the circuit 10 is also designed to operate at the faster data rate to sample all of the data points. If the circuit 10 does use the sub-set sample portion for timing recovery, then a control logic 80 can be provided before the down-conversion and pre-filtering at the sub-circuit 18 that receives the in-phase and quadrature phase signals from the down-converter 12. The control logic 80 outputs the in-phase and quadrature phase sample signals at a slower clock rate where only the samples 72 in the first portion 76 of the observation period 74 are passed through the circuit 10. Therefore, as discussed above, the sampling clock rate of the circuit 10 would depend on the observation period time at the higher data rate and the number of samples in the first portion 76.

The foregoing discussion discloses and describes merely exemplary embodiments of the present disclosure. One skilled in the art will readily recognize from such discussion, and from the accompanying drawings and claims, that various changes, modifications and variations can be made therein without departing from the spirit and scope of the invention as defined in the following claims.

What is claimed is:

1. A method for providing timing recovery of a received digital data stream in a receiver including a series of consecutive data samples, said method comprising:
    separating the digital data stream into a series of consecutive observation periods where each observation period includes a predetermined number of the consecutive data samples;
    identifying a series of consecutive timing recovery data samples in each observation period where a number of the timing recovery data samples is less than the predetermined number of the consecutive data samples in the observation period and where the timing recovery data samples are used for timing recovery and other data samples in the observation period are not used for timing recovery; and
    using the consecutive timing recovery data samples in each observation period to provide the timing recovery where the timing recovery of the data stream using the timing recovery data samples is performed during an entire time period that each of the observation periods in the digital data stream is being received by the receiver, wherein control logic is employed that receives the digital data stream at a particular clock rate and outputs only the timing recovery data samples at a slower clock rate than the particular clock rate, and wherein the control logic provides only the timing recovery data samples at the slower clock rate to a timing recovery circuit in the receiver.

2. The method according to claim 1 wherein separating the digital data stream into a series of consecutive observation periods includes defining the series of observation periods so that they have the same number of data samples.

3. The method according to claim 1 wherein the number of data samples used for timing recovery in each observation period is less than the number of data samples that are not used for timing recovery in the observation period.

4. The method according to claim 1 wherein the consecutive data samples that are used for timing recovery in each observation period are at the beginning of each observation period.

5. The method according to claim 1 wherein using the timing recovery data samples for timing recovery includes using a timing recovery process that is non-data driven.

6. The method according to claim 1 wherein the digital data stream includes in-phase and quadrature phase data streams.

7. The method according to claim 6 wherein the in-phase and quadrature phase data streams are Fs/4 down-converted in-phase and quadrature phase data streams.

8. The method according to claim 1 wherein the receiver is part of a high frequency digital modem.

9. A method for providing timing recovery of a received digital data stream in a receiver including a series of consecutive data samples, said method comprising:
    separating the digital data stream into a series of consecutive observation periods where each observation period includes the same number of consecutive data samples;
    identifying a series of consecutive timing recovery data samples in each observation period where the timing recovery data samples are used for timing recovery and other data samples in the observation period are not used for timing recovery, where a number of the timing recovery data samples is less than the predetermined number of the consecutive data samples in the observation period and where the number of data samples used for timing recovery in each observation period is less than the number of data samples that are not used for timing recovery in the observation period; and
    using the consecutive timing recovery data samples in each observation period to provide the timing recovery where the timing recovery of the data stream using the timing recovery data samples is performed during an entire time period that each of the observation periods in the digital data stream ace is being received by the receiver, wherein control logic is employed that receives the digital data stream at a particular clock rate and outputs only the timing recovery data samples at a slower clock rate than the particular clock rate, and wherein the control logic provides only the timing recovery data samples at the slower clock rate to a timing recovery circuit in the receiver.

10. The method according to claim 9 wherein the consecutive data samples that are used for timing recovery in each observation period are at the beginning of each observation period.

11. The method according to claim 9 wherein the digital data stream includes in-phase and quadrature phase data streams.

12. The method according to claim 11 wherein the in-phase and quadrature phase data streams are Fs/4 down-converted in-phase and quadrature phase signals.

13. A system for providing timing recovery of a received digital data stream in a receiver including a series of consecutive data samples, said system comprising:
    means for separating the digital data stream into a series of consecutive observation periods where each observation period includes a predetermined number of the consecutive data samples;
    means for identifying a series of consecutive timing recovery data samples in each observation period where a number of the timing recovery data samples is less than the predetermined number of the consecutive data samples in the observation period and where the timing recovery data samples are used for timing recovery and other data samples in the observation period are not used for timing recovery; and means for using the consecutive timing recovery data samples in each observation period to provide the timing recovery where the timing recovery of the data stream using the timing recovery data samples is performed during an entire time period that each of the observation periods in the digital data stream is being received by the receiver, wherein control logic is employed that receives the digital data stream at a particular clock rate and outputs only the timing recovery data samples at a slower clock rate than the particular clock rate, and wherein the control logic provides only the timing recovery data samples at the slower clock rate to a timing recovery circuit in the receiver.

14. The system according to claim 13 wherein the means for separating the digital data stream into a series of consecutive observation period defines the series of observation periods so that they have the same number of data samples.

15. The system according to claim 13 wherein the number of data samples used for timing recovery in each observation period is less than the number of data samples that are not used for timing recovery in the observation period.

16. The system according to claim 13 wherein the means for identifying a series of consecutive timing recovery data samples identifies the timing recovery data samples at the beginning of each observation.

17. The system according to claim 13 wherein the means for using the timing recovery data samples uses a timing recovery process that is non-data driven.

18. The system according to claim 13 wherein the digital data stream includes in-phase and quadrature phase data streams.

19. The system according to claim 18 wherein the in-phase and quadrature phase data streams are Fs/4 down-converted in-phase and quadrature phase data streams.

20. The system according to claim 13 wherein the receiver is part of a high frequency digital modem.

* * * * *